(No Model.)

W. W. SCOTT.
TEA KETTLE.

No. 477,386. Patented June 21, 1892.

Witnesses:
W. P. Smith
R. H. Orwig

Inventor: William W. Scott,
By Thomas C. Orwig, Attorney.

UNITED STATES PATENT OFFICE.

WILLIAM W. SCOTT, OF ALGONA, IOWA, ASSIGNOR OF ONE-HALF TO J. F. GILMORE, OF SAME PLACE.

TEA-KETTLE.

SPECIFICATION forming part of Letters Patent No. 477,386, dated June 21, 1892.

Application filed February 21, 1891. Serial No. 382,312. (No model.)

*To all whom it may concern:*

Be it known that I, WILLIAM W. SCOTT, a citizen of the United States of America, and a resident of Algona, in the county of Kossuth and State of Iowa, have invented a new and useful Improvement in Tea-Kettles, of which the following is a specification.

The object of my invention is to provide means to prevent the steam from escaping from a tea-kettle beneath the hands of the user and scalding them; also, to provide means to allow the air to enter the kettle as the water escapes therefrom; also, to prevent rusting and corroding the top of the kettle, and also to provide a filter through which the water is passed on entering the kettle.

My invention consists in the construction of a tea-kettle having a spout for the emptying of water therefrom and an auxiliary spout through which the steam may escape from the kettle.

My invention consists, further, in the provision of a pipe having a filter therein, through which filter and pipe water is poured to fill the kettle.

My invention consists, further, in certain details of construction hereinafter set forth, pointed out in my claims, and illustrated by the accompanying drawings, in which—

Figure 1:
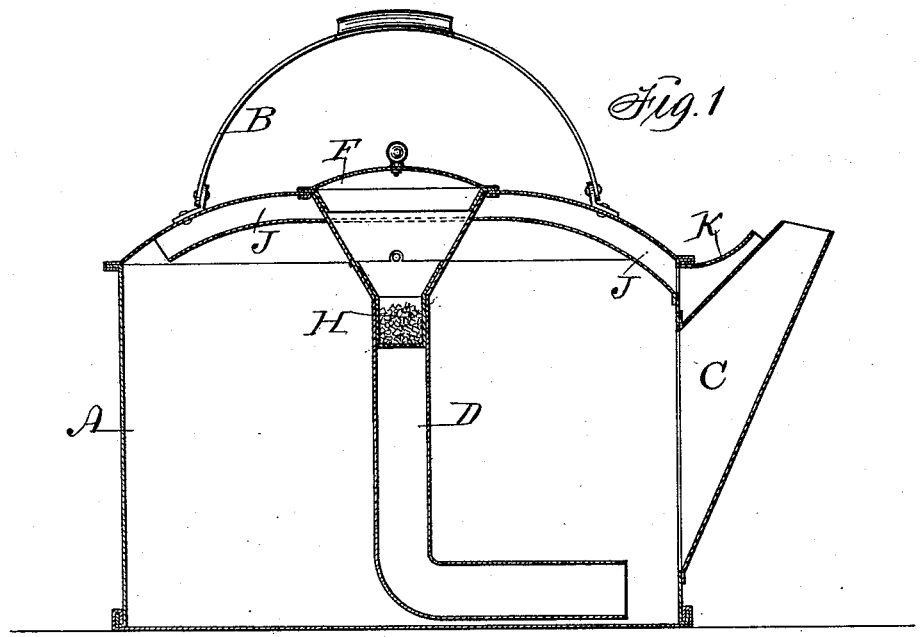
Figure 2:
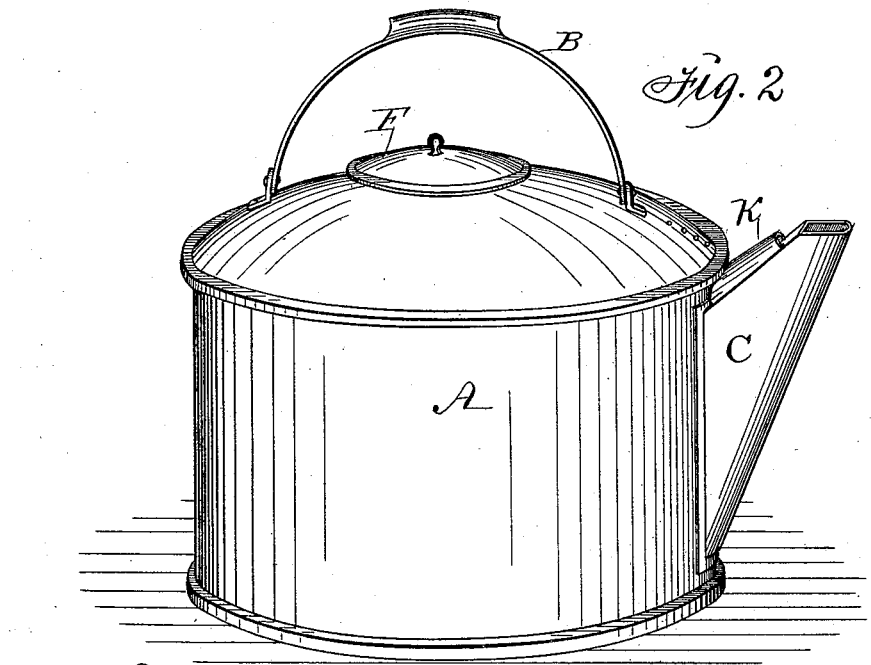

Figure 1 is a vertical sectional view of the complete kettle. Fig. 2 is a perspective view of the same.

A represents a tea-kettle of common form having a handle B and spout C.

D represents an open-ended pipe the upper end of which is bell-mouthed and is soldered or screwed to the circumference of an opening in the top of the kettle. The lower portion of this pipe has an elbow therein and projects therefrom toward the spout C. The upper end of this pipe is fitted with a cover F, which may be removed therefrom. By thus extending the pipe horizontally and terminating in close proximity to the opening at the bottom of the pouring-spout the lower open end of the pipe will remain submerged when the kettle is tilted to pour out hot water, and consequently the confined steam within the kettle and around the pipe will not enter the pipe to lift the top-cover and escape against a person's hand applied to the handle, as required in pouring boiling water from the kettle.

A removable filter H is fitted in the top portion of the pipe D, thus forming a chamber above said partition in which filtering material may be placed to purify the water which passes through the pipe before entering the ketle.

J represents an open-ended pipe fixed to the under side of the top of the kettle and extending nearly across said kettle, and the other end connects with a spout K, located above and in juxtaposition to the spout C and opening outside of the kettle. By thus extending the tube across the under side of the permanently-closed top of the kettle water is prevented from escaping through the tube in the act of pouring and the tube will always be open for the admission and escape of steam.

In the practical use of my invention the water enters the kettle through the pipe D and is cleansed by the filtering material in said pipe. The water leaves the kettle through the spout C, and while so doing air may enter the kettle through the spout K and pipe J. Steam generated within the kettle will escape through the pipe J and spout K, thus preventing the hands of the operator from being burned thereby.

I claim as my invention—

1. A tea-kettle having an open-ended pipe fixed in an opening in the closed top of the kettle and said pipe being conical at its top end and adapted to admit a filter of corresponding shape and size, a detachable filter fitted in said open top, and the lower end of the pipe terminating in close proximity to the opening communicating with the pouring-spout.

2. In a tea-kettle having an open-ended pipe fixed in a central opening in the closed top to project downward, an open-ended tube fixed to the under side of the fixed top and extended from near the open-top end of a pouring-spout around the said fixed downwardly-projecting pipe and across the under side of the top of the kettle, as shown and described, for the purposes stated.

WILLIAM W. SCOTT.

Witnesses:
J. W. SULLIVAN,
J. F. GILMORE.